United States Patent [19]

Lovell et al.

[11] 4,192,935

[45] Mar. 11, 1980

[54] ETHYLENE POLYMERS OF HIGH MELT INDEX

[75] Inventors: Peter J. Lovell, Kingston; Ian C. B. Saunders, Sarnia, both of Canada

[73] Assignee: DuPont of Canada Limited, Montreal, Canada

[21] Appl. No.: 170

[22] Filed: Jan. 2, 1979

[30] Foreign Application Priority Data

Jan. 6, 1978 [GB] United Kingdom ............... 00517/78

[51] Int. Cl.$^2$ .................... C08F 210/02; C08F 210/16
[52] U.S. Cl. ................................ 526/348.6; 264/325; 526/348.2; 526/348.3; 526/348.7
[58] Field of Search ............... 526/348.6, 348.2, 348.3, 526/348.7

[56] References Cited

FOREIGN PATENT DOCUMENTS 856137 11/1970 Canada.

*Primary Examiner*—Stanford M. Levin

[57] ABSTRACT

An ethylene polymer having a density in the range of about 0.940–0.960, a melt index in the range 100–200 and a ratio of weight-average molecular weight to number-average molecular weight of less than 5 is disclosed. The polymer is a copolymer of ethylene and at least one α-olefin having 4–10 carbon atoms e.g. butene-1, hexene-1 or octene-1. The preferred polymer is a copolymer of ethylene and butene-1. The polymers may be used in the injection molding of thin-wall containers e.g. containers having a wall thickness of less than 0.7 mm, especially a thickness of less than 0.5 mm and in particular a thickness of less than 0.4 mm.

5 Claims, No Drawings

ETHYLENE POLYMERS OF HIGH MELT INDEX

BACKGROUND OF THE INVENTION

1. Field of the Invention

The present invention relates to ethylene polymers of high melt index and in particular to ethylene/α-olefin copolymers having a melt index of at least 100 and especially in the range 100–200.

2. Description of the Prior Art

Melt index is a measure of melt viscosity which is related to the molecular weight of the polymer. As referred to herein the melt index of a polymer is that measured by the method of ASTM D-1238 (condition E).

Ethylene homopolymers and ethylene/α-olefin copolymers, in which the α-olefin is an aliphatic hydrocarbon, are sometimes referred to as polyethylenes. Such polyethylenes are capable of being used in a wide variety of end uses, the end use depending in particular on the physical properties of the polymer. One such physical property is the melt index of the polymer. Polymers of relatively low melt index, for example, less than about 10 and especially less than about 1 and having a density of about 0.915–0.960 may be extruded in the form of film. Such film may be used as a packaging material.

Polyethylene is also capable of being fabricated into articles by moulding techniques especially injection moulding techniques. Moulding grade polyethylene is usually of higher melt index than that used in the manufacture of film. Typically, the melt index of polyethylene used in injection moulding processes is in the range of about 0.3 to 45 while the density is usually in the range of about 0.915 to 0.965. However an ethylene/α-olefin polymer containing less than 0.1% of butene-1 as the α-olefin and having a melt index of 85 and a density of 0.959 is commercially available as an injection moulding resin.

Examples of articles that may be manufactured by injection moulding processes are containers especially containers that are used for the packaging of ice cream, yogurt, margarine and the like. Such containers should be of relatively uniform thickness and should have a surface that is acceptable to the consumer. The economics of the manufacture of containers by injection moulding processes depend at least in part of the thickness of the walls of the container, especially the minimum thickness consistent with the manufacture of containers of acceptable appearance and physical properties, and the rate, e.g., cycle time, at which such containers may be manufactured. Small containers tend to be of lower wall thickness than larger containers as less flow of polymer is required during the injection moulding process in order to fill the mould. Typical wall thicknesses of containers manufactured in injection moulding processes are at least 0.7 mm. Attempts to manufacture containers of lower wall thickness e.g., less than 0.5 mm, have generally been unsuccessful especially because of process problems that result in incompletely fabricated containers, containers having non-uniform wall thickness as a result of process problems and/or containers of poor surface appearance. It is an object of the present invention to provide polyethylenes of improved processability, especially in injection moulding processes, and in particular for the manufacture of containers having a wall thickness of less than about 0.7 mm.

SUMMARY OF THE PRESENT INVENTION

Accordingly, the present invention provides an ethylene polymer having a density in the range of about 0.940–0.960, a melt index in the range 100–200 and a ratio of weight-average molecular weight to number-average molecular weight of less than 5, said polymer being a copolymer of ethylene and at least one α-olefin having 4–10 carbon atoms, the α-olefin being an aliphatic hydrocarbon.

In an embodiment of the polymer of the present invention, the ratio of weight-average molecular weight to number-average molecular weight is less than 3.5.

In a further embodiment the polymer is an ethylene/butene-1 copolymer.

The present invention also provides in a process for the manufacture of containers having a wall thickness of less than 0.7 mm, said containers being manufactured from thermoplastic polymer by injection moulding said polymer, the improvement comprising using as the thermoplastic polymer an ethylene polymer having a density in the range of about 0.940–0.960, a melt index in the range 100–200 and a ratio of weight-average molecular weight to number-average molecular weight of less than 5, said polymer being a copolymer of ethylene and at least one α-olefin having 4–10 carbon atoms, the α-olefin being an aliphatic hydrocarbon.

DETAILED DESCRIPTION OF THE INVENTION

Polyethylenes capable, in particular, of being fabricated by injection moulding processes into containers having a reduced wall thickness and/or having improved flow properties in moulding processes have now been found.

The ethylene polymer of the present invention is a copolymer of ethylene and at least one α-olefin of 4–10 carbon atoms, such α-olefins being aliphatic hydrocarbons. The preferred α-olefins having 4–8 carbon atoms, for example, butene-1, hexene-1 and octene-1. In a preferred embodiment the copolymer is a copolymer of ethylene and only one α-olefin, especially where the α-olefin is butene-1.

The polymers of the present invention have melt indices in the range of about 100–200. In a preferred embodiment the polymers have melt indices in the range 100–150.

The density of the polymers of the present invention may be in the range of about 0.940–0.960, the density being determined primarily by the amount of α-olefin in the polymer. When the α-olefin is butene-1 the above range of density corresponds to a range of about 0.2–2.0% by weight of butene-1 in the copolymer. The density of the polymer is that measured by the method of ASTM D-1505.

The polymers of the present invention are also characterized by a ratio of weight average molecular weight ($M_w$) to number average molecular weight ($M_n$) of less than about 5. Preferably the ratio of $M_w:M_n$ is less than about 3.5. The ratio of $M_w:M_n$ may be determined by gel permeation chromatography.

The polymers of the present invention are capable of being used in a variety of uses. In particular the polymers are capable of being used in the manufacture of containers especially in the manufacture of containers by injection moulding techniques. The polymers may be used in the manufacture of containers having a wall thickness of less than 0.7 mm, especially less than 0.5 mm, and in particular less than 0.4 mm. The design of the containers manufactured from the polymers of the present invention is more critical than the design of containers manufactured from polymers of lower melt index. For example, the containers should be designed so as to eliminate or reduce "stress-points" e.g., the junction of the bottom of the container and the walls of the container should be smoothly rounded and not angular. Such design will be understood in the art. Containers manufactured with high melt index polymers tend to have a uniform polymer density and to be substantially free of stresses in comparison to containers of conventional polymers.

The polymers of the present invention are copolymers and not homopolymers. Containers injection moulded from ethylene homopolymers having a density of greater than 0.960 and a high melt index tend to be more susceptible to brittleness and to cracking when flexed. Containers injection moulded from the copolymers of the present invention are substantially more resistant to cracking when flexed.

The polymers of high melt index preferably contain antioxidants known for polymers of ethylene. The polymers of the present invention may also contain pigments of the kind used for conventional polyethylenes.

The polymers of the invention may be polymerized from the monomers using a process of the type disclosed in Canadian Pat. No. 856,137 which issued on Nov. 17, 1970 to W. E. Baker, I. C. B. Saunders and J. M. Stewart. In such a process ethylene monomer admixed with α-olefin is dissolved in an inert solvent, for example, cyclohexane, and introduced into a reaction zone. The monomers are copolymerized in the reaction zone in the presence of a co-ordination catalyst which is separately injected in solvent into the reaction zone. Pressure and temperature are controlled so that the polymer formed remains in solution. Hydrogen may be added to the feed at a rate of, for example, 40–120 parts per million by weight based on the reactor feed, in order to obtain and control the melt index and/or molecular weight distribution. The polymerization catalyst is usually deactivated immediately after the ethylene copolymer leaves the reaction zone.

Catalysts useful for the preparation of the polymers are the so-called co-ordination catalysts. These catalysts may, for example, be obtained by mixing a compound of titanium or zirconium preferably one in which the said metals are attached to groups such as -oxyhydrocarbon, -halide or any combination thereof, with an organometallic reducing agent as the second component. The catalyst used may, for example, be composed of a titanium halide and a reducing component such as an aluminum alkyl. Preferred catalyst combinations are titanium tetrachloride and aluminum triethyl, or a mixture of vanadium oxychloride, titanium tetrachloride and aluminum triisoprenyl.

After deactivation of the catalyst the polymer may be passed through a bed of activated alumina or bauxite which removes substantially all of the deactivated catalyst residues. The solvent may then be flashed off from the polymer and the polymer extruded into water and cut into pellets or other suitable comminuted shapes.

The present invention is illustrated by the following examples. In the examples melt index was measured according to the aforementioned ASTM procedure except that, because of the high flow rates of the polymers, a weight of 1060 g was used. Melt index was then determined from an extrapolated calibration curve obtained using polymers having a melt index of less than 100.

All parts and percentages are by weight, unless otherwise specified.

EXAMPLE I

A mixture of ethylene and butene-1 in cyclohexane solution were copolymerized in a commercial-scale stirred autoclave reactor in the presence of a catalyst comprising vanadium oxytrichloride, titanium tetrachloride and aluminum isoprenyl. Hydrogen was fed to the reactor. The reaction was terminated using an organic acid deactivator and the polymer was subsequently separated from the cyclohexane.

Further experimental details and the results obtained are given in Table I.

TABLE I

| Run No. | 1 | 2 | 3 | 4 | 5 |
| --- | --- | --- | --- | --- | --- |
| Feed | | | | | |
| Ethylene (%) | 17.8 | 17.7 | 17.8 | 18.0 | 18.0 |
| Butene (%) | 4.4 | 4.4 | 4.4 | 17 | 17 |
| Hydrogen (ppm) | 87 | 96 | 112 | 82 | 61 |
| Temperature (°C.) | | | | | |
| Inlet | 58 | 58 | 80 | 56 | 56 |
| Outlet | 278 | 279 | 288 | 279 | 279 |
| Ethylene Conversion (%) | 96.4 | 96.1 | 97.1 | 94.4 | 94.4 |
| Polymer Density (g/cm$^3$) | 0.957 | 0.958 | 0.960 | 0.947 | 0.947 |
| Melt Index | 100 | 117 | 190 | 126 | 104 |
| $M_w/M_n$* | NA | NA | NA | 3.1 | NA |

NA = not available, values believed to be about 3.0
*obtained by gel permeation chromatography, calibrated with university contact resins obtained from E.I. du Pont de Nemours and Company, Wilmington, Delaware, U.S.A. A sample of polymer having a density of 0.949 and a melt index of 166 had a $M_w/M_n$ of 3.0.

EXAMPLE II

Using an ethylene/butene-1 polymer of the invention, having a density 0.958 and melt index of 138, containers having a wall thickness of 0.58 mm were moulded in a commercial-scale high speed injection moulding process. Melt temperatures were not measured. However all zone and nozzle temperatures were about 55° C. lower than those necessary to process a commercial polyethylene of melt index of 60 using the same mould. Cycle times were reduced from about 5.2 seconds per container, using the commerical polyethylene resin, to about 4.1 seconds per container when the polyethylene of melt index of 138 was used. The containers were of 500 ml capacity, of a type used for packaging food, and had a shape which was recognized as imparting poor impact strength to the container e.g. had a lip, stacking shoulder and base cross-sections which were angular.

Samples of the containers were filled with water and a lid was placed on the containers. The filled containers were dropped, bases down, onto a concrete floor from various heights. No containers broke when dropped from a height of 1.5 m.

Further samples of the containers were placed on a concrete floor and crushed underfoot. Only one or two splits in each container were observed.

EXAMPLE III

Using an ethylene/butene-1 polymer of the invention, having a density 0.949 and melt index of 105, containers having a wall thickness of 0.58 mm were moulded in a commercial-scale high speed injection moulding process. Melt temperatures were not measured. However all zone and nozzle temperatures were about 55° C. lower than those necessary to process a commercial polyethylene of melt index of 60 using the same mould. Cycle times were reduced from about 5.2 seconds per container, using the commercial polyethylene resin, to about 4.1 seconds per container when the polyethylene of melt index of 105 was used. The containers were of 500 ml capacity used for packaging food, and had a shape which was recognized as imparting poor impact strength to the container e.g. had a lip, stacking shoulder and base cross-sections which were angular.

Samples of the containers were filled with water and a lid was placed on the containers. The filled containers were dropped, bases down, onto a concrete floor from various heights. No containers broke when dropped from a height of 1.5 m.

Further samples of the containers were placed on a concrete floor and crushed underfoot. No cracks were observed in any of the containers.

EXAMPLE IV

Using the procedure described in Example I ethylene and butene-1 were copolymerized to yield a polymer having a density of 0.959, a melt index of 138 and a ratio of $M_w/M_n$ of less than 5.0. Details of the copolymerization process were as follows:

Feed: Ethylene 17.8%, Butene-1 4.4%, Hydrogen 95 ppm.
Temperature: Inlet 58° C., Outlet 278° C.
Ethylene Conversion 96.4%.

The polymer obtained was ground to a fine powder, dry blended with 1000 ppm of talc and re-extruded into pellets. Containers having a wall thickness of 0.36 mm were moulded from the pellets in a commercial-scale high speed injection moulding process using an experimental four cavity mould. The containers were of 500 ml capacity and of a shape which was recognized as imparting poor top loading strength but reasonable impact strength e.g. rounded base cross-sections and a filleted stacking shoulder. Acceptable containers were moulded at a cycle time of 4.0 seconds.

Samples of the containers were filled with water, lidded and dropped, base down, onto a concrete floor. An $F_{50}$ i.e the height were 50% of the containers failed, of one meter was obtained.

Further samples of the container were top loaded with a 30 lb. weight. After 2 hours buckling was observed and after 24 hours all containers were completely crushed.

In the light of the above the containers are capable of being used in a wide variety of packaging end-uses, e.g. for the packaging of food and small articles.

We claim:

1. An ethylene polymer having a density in the range of about 0.940–0.960, a melt index in the range 100–200 and a ratio of weight-average molecular weight to number-average molecular weight of less than 5, said polymer being a copolymer of ethylene and at least one $\alpha$-olefin having 4–10 carbon atoms, the $\alpha$-olefin being an aliphatic hydrocarbon.

2. The polymer of claim 1 in which the melt index is in the range 100–150.

3. The polymer of claim 2 in which the ratio of weight-average molecular weight to number-average molecular weight is less than 3.5.

4. The polymer of claim 3 in which the polymer is a copolymer of ethylene and an $\alpha$-olefin having 4–8 carbon atoms.

5. The polymer of claim 3 in which the polymer is a copolymer of ethylene and butene-1.

* * * * *

UNITED STATES PATENT OFFICE
CERTIFICATE OF CORRECTION

PATENT NO. : 4,192,935
DATED : March 11, 1980
INVENTOR(S) : Peter J. Lovell and Ian C. B. Saunders It is certified that error appears in the above-identified patent and that said Letters Patent are hereby corrected as shown below:

Column 4, Table I line beginning "Butene (%)" delete
"4.4    4.4    4.4    17    17".

Column 5, line 29 delete "4.4%"

Signed and Sealed this

Fifth Day of July 1983

[SEAL]

Attest:

GERALD J. MOSSINGHOFF

Attesting Officer    Commissioner of Patents and Trademarks